United States Patent
Abiko et al.

(10) Patent No.: US 8,343,255 B2
(45) Date of Patent: Jan. 1, 2013

(54) FORGED PRODUCT AND CRANKSHAFT MANUFACTURED FROM IT

(75) Inventors: Takashi Abiko, Kobe (JP); Michio Nishihara, Takasago (JP); Eiji Otsuki, Takasago (JP); Shunsuke Hori, Takasago (JP); Tomoya Shinozaki, Takasago (JP); Tetsushi Deura, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 193 days.

(21) Appl. No.: 12/505,736

(22) Filed: Jul. 20, 2009

(65) Prior Publication Data
US 2010/0081004 A1    Apr. 1, 2010

(30) Foreign Application Priority Data
Sep. 30, 2008  (JP) .................................. 2008-255478

(51) Int. Cl.
C22C 33/08 (2006.01)
C22B 9/00 (2006.01)
C22C 38/44 (2006.01)
B22D 3/00 (2006.01)
B32B 15/02 (2006.01)

(52) U.S. Cl. ............................ 75/507; 148/335; 428/544

(58) Field of Classification Search .................. 148/226, 148/335; 428/544; 75/507
See application file for complete search history.

(56) References Cited

U.S. PATENT DOCUMENTS
2002/0139451 A1 * 10/2002 Ishida et al. .................. 148/333

FOREIGN PATENT DOCUMENTS
| EP | 1 420 078 A2 | 5/2004 |
| EP | 1 420 078 A3 | 5/2004 |
| EP | 1 978 124 A1 | 10/2008 |
| FR | 1 092 002 | 4/1955 |
| GB | 1 313 008 | 4/1973 |
| JP | 49-35232 | 4/1974 |
| JP | 58-29546 | 2/1983 |
| JP | 59-178153 | 10/1984 |
| JP | 2003147478 A * | 5/2003 |
| JP | 2006-336092 | 12/2006 |
| JP | 2006336092 A * | 12/2006 |

OTHER PUBLICATIONS

Shigeo Omata, et al., "Study on Fatigue Strength of High Tensile Steels for Crankshaft", Journal of the JIME, vol. 36, No. 6, 2001, pp. 385-391.

* cited by examiner

*Primary Examiner* — Kiley Stoner
*Assistant Examiner* — Alexander Polyansky
(74) *Attorney, Agent, or Firm* — Oblon, Spivak, McClelland, Maier & Neustadt, L.L.P.

(57) ABSTRACT

When the density ($D_O$) of the inclusions whose major axis exceeds 5 μm observed in the axis position of a section perpendicular to the axial direction of a forged product is made 70 nos/cm² or below and the radius of the forged product is made R, the ratio of the density ($D_R$) of the inclusions whose major axis exceeds 5 μm observed in the R/3 position from the axis position toward the radial direction and the density $D_O$ satisfies an inequality (1) below.

$$0.5 \leq D_R/D_O \leq 1.50 \qquad (1)$$

16 Claims, 2 Drawing Sheets

FORGED PRODUCT AND CRANKSHAFT MANUFACTURED FROM IT

BACKGROUND OF THE INVENTION

1. Field of the Invention

The present invention relates to a forged product obtained by hot forging of a steel ingot and a crankshaft obtained using it, particularly to a forged product wherein the dispersion state of inclusions present in steel is controlled.

2. Description of the Related Art

For machinery, a vessel, a generator or the like, a rotary motion part (crankshaft, for example) is used as a member transferring energy of a driving source. The rotary motion part is manufactured using, for example, a forged product obtained by hot forging of a steel ingot manufactured by an ingot-making method, and fatigue properties wherein a fatigue failure hardly occurs even under a severe using environment are required.

With regard to low alloy steel adopted for a crankshaft for a vessel, "Study on fatigue strength properties of high strength crankshaft material", Journal of the JIME, 2001, Vol. 36, No. 6, p. 385-390, describes that (1) an inclusion is liable to become a starting point of a fatigue failure and such tendency becomes conspicuous as the steel is high-strengthened, (2) as the size of inclusions becomes large, fatigue properties lower, (3) steel material containing elongated inclusions is liable to show anisotropy of fatigue strength, and the like. Also it describes that, in order to improve fatigue properties of a forged product, it is effective to make the shape of inclusions spherical and to make the size small.

Incidentally, in order to manufacture a large-size crankshaft used for a vessel or the like, a large-size ingot is naturally required. When a large-size ingot is manufactured by an ingot-making method, a settled crystal zone is formed in the bottom part of the ingot (that means the end part in the gravity direction). The settled crystal means a crystal nucleus of steel formed on the surface of molten steel (boundary face between heat insulating material and oxidation inhibitor and molten steel) during and after molten steel is poured into a mold, molten from its root by molten steel convection within the mold, physically divided, and settled in the molten steel by density difference with the molten steel. While the crystal nucleus settles in the molten steel, a part of inclusions in the molten steel is caught, and inclusions segregate in the bottom part of the steel ingot. Aggregation of the settled crystals and inclusions thus formed is the settled crystal zone. Formation of the settled crystal zone becomes a cause of deterioration of fatigue properties in the bottom part of the steel ingot. The settled crystal zone does not appear in the steel ingot manufactured by a continuous casting method.

As a technology for reducing and inhibiting accumulation of inclusions in the settled crystal zone, Japanese Published Unexamined Patent Application No. S49-35232 discloses that, in manufacturing killed steel by a bottom-pouring method or top-pouring method, the top surface of the molten steel in the mold is to be covered with an early combustion type high-calorie heat insulating agent during pouring of the molten steel or immediately after pouring of the molten steel.

In Japanese Published Unexamined Patent Application No. S59-178153, it is described that, in order that inclusions do not concentrate and remain in the bottom part of a steel ingot, a top part heat insulating material-cum-antioxidant is to be used, the pouring temperature of the molten steel is to be made in the range of the melting point plus 75-100 DEG. C., and 90% or more of the top part heat insulating material-cum-antioxidant is to be added prior to pouring of the molten steel or within 60% or less of the total pouring time.

As described in Japanese Published Unexamined Patent Application Nos. S49-35232 and S59-178153, in order to inhibit formation of the settled crystal zone, it is effective to heat-insulate the upper part of the steel ingot (which means the end part opposite to the bottom part), however the fatigue strength may possibly vary between the upper part and the bottom part of the steel ingot, and there was a case that a homogenous forged product could not be obtained. Also, when the fatigue strength of an axis position of the steel ingot and the peripheral part apart from the axis position in the radial direction are measured, a difference in the fatigue strength is recognized according to the measuring position.

SUMMARY OF THE INVENTION

The present invention was developed considering such circumstance, and its purpose is to provide a forged product excellent in fatigue properties wherein the fatigue strength is high in both end parts of the forged product and variation of the fatigue strength in the radial direction of the forged product is little, and a crankshaft manufactured from the forged product.

The forged product in relation with the present invention that could solve the problems described above is a columnar forged product obtained by hot forging of a steel ingot containing: C: 0.15-0.75% (means mass %, hereinafter the same), Si: 0.1-0.6%, Mn: 0.3-1.4%, Ni: 0.1-2%, Cr: 0.5-2.5%, Mo: 0.1-0.5%, V: 0.01-0.20%, Al: 0.015-0.04% respectively, satisfying: Ti: 0.003% or below (not inclusive of 0%), S: 0.0006% or below (not inclusive of 0%), N: 0.01% or below (not inclusive of 0%), O: 0.002% or below (not inclusive of 0%), and the balance comprising iron with inevitable impurities, wherein the density ($D_O$) of the inclusions whose major axis exceeds 5 μm observed in the axis position of a section perpendicular to the axial direction of the forged product is 70 nos/cm$^2$ or below, and, when the radius of the forged product is made R, the ratio of the density ($D_R$) of the inclusions whose major axis exceeds 5 μm observed in the R/3 position from the axis position in the radial direction and the density $D_O$ satisfies an inequality (1) below.

$$0.5 \leq D_R/D_O \leq 1.50 \quad (1)$$

It is preferable that the forged product is of a circular cylindrical shape and satisfies the inequality (1) in both end faces of the forged product.

The present invention includes a crankshaft manufactured from the forged product as well. The shaft diameter of the crankshaft may be 200 mm or above, and the crankshaft can be used for a diesel engine for power generation or for a vessel, for example.

According to the present invention, among the factors affecting fatigue properties of a forged product, coarse inclusions whose major axis exceeds 5 μm are watched and are dispersed homogenously in the forged product, therefore the forged product excellent in fatigue properties, wherein fatigue strength of the forged product is high, and the difference of fatigue strength is little between an axis position of the forged product and the peripheral part apart from the axis position in the radial direction, can be provided. A crankshaft manufactured from the forged product becomes excellent in fatigue properties.

DETAILED DESCRIPTION OF THE PREFERRED EMBODIMENTS

As was disclosed in Japanese Published Unexamined Patent Application Nos. S49-35232 and S59-178153, it was known that even if the settled crystal zone formed in the bottom part of the steel ingot was reduced by enhancing heat insulation of the upper part of the steel ingot, the fatigue strength varied between the upper part and the bottom part of the steel ingot. Accordingly, in the forged product obtained from the steel ingot also, the fatigue strength varied between both end parts. Further, it was known that the fatigue strength varied also between the axis position of the forged product and the peripheral part apart from the axis position, and that the difference became conspicuous as the forged product became large.

Under the circumstance, the present inventors have made intensive studies in order to provide a forged product excellent in fatigue properties wherein fatigue strength is high in both end parts of the forged product and, even when the fatigue strength of the forged product is measured from the axis position toward the radial direction, variation of the fatigue strength is little. As a result, it was found out that if coarse inclusions whose major axis exceeds 5 μm were dispersed homogenously in the forged product, fatigue strength of the forged product could be made homogenous, and the present invention has been developed. In other words, the forged product in accordance with the present invention satisfies the requirements of (A) and (B) described below when the section perpendicular to the axial direction is observed.

(A) The density ($D_O$) of the inclusions whose major axis exceeds 5 μm observed in the axis position is 70 nos/cm² or below.

(B) When the radius of the forged product is made R, the ratio of the density ($D_R$) of the inclusions whose major axis exceeds 5 μm observed in the R/3 position from the axis position toward the radial direction and the density $D_O$ satisfies the inequality (1) below.

$$0.5 \leq D_R/D_O \leq 1.50 \tag{1}$$

Before each requirement is described, the shape of the forged product in accordance with the present invention will be described. The forged product in accordance with the present invention is of a columnar shape with a radius R, and, in this specification, the axis position of the forged product is described as "0R position" and the surface of the forged product is described as "R position". Accordingly, R/3 position means the position apart from the axis position by the distance of R/3 toward the surface of the forged product. Also, in this specification, 0(zero)R position is called "axis position" and R/3 position is called "peripheral part". Further, the columnar shape does not have to be a perfect circle in its shape of the section perpendicular to the axial direction, but may be more or less flattened, or may be of a polygonal shape. A circular cylindrical shape is preferable.

[On (A)]

As a result of the study by the present inventors, it was known that, in observing the axis position of the forged product, if the density ($D_O$) of the inclusions whose major axis exceeded 5 μm was 70 nos/cm² or below, fatigue properties of the forged product improved. The reason is that, if the density ($D_O$) of the inclusions in the axis position of the forged product exceeds 70 nos/cm², coarse inclusions segregated in the axis position of the forged product increase, therefore the coarse inclusions become a starting point of a fatigue failure, the fatigue failure occurs in the axis position, and fatigue properties of the forged product deteriorate. Therefore, the density $D_O$ of inclusions should be made 70 nos/cm² or below, preferably 60 nos/cm² or below, and more preferably 50 nos/cm² or below.

Inclusions are liable to segregate in the axis position of the forged product. The reason lies in the production process of the forged product. In other words, because the steel ingot before forging used in manufacturing the forged product is manufactured by casting of molten steel, the molten steel solidifies starting from the periphery, and the axis position (center part) of the steel ingot solidifies last. Therefore, the density of inclusions in the axis position is liable to become higher than the density of inclusions in the peripheral part because there is the influence of the positive segregation in the upper part of the steel ingot and formation of the settled crystal zone in the bottom part. This tendency becomes conspicuous as the size (radius) of the steel ingot increases.

The lower limit of the density $D_O$ of the inclusions whose major axis exceeds 5 μm in the axis position of the forged product can be in the range satisfying the inequality (1) described below, however, if the density $D_O$ in the axis position of the forged product becomes excessively low and is much lower than 40 nos/cm², remaining inclusions segregate in the peripheral part. Consequently, fatigue properties in the peripheral part deteriorate. Therefore, the density $D_O$ of the inclusions in the axis position of the forged product is preferably 40 nos/cm² or above, more preferably 50 nos/cm² or above.

[On (B)]

Although the density $D_O$ of the inclusions whose major axis exceeds 5 μm in the axis position of the forged product is stipulated in (A) described above, fatigue properties of the forged product cannot be improved sufficiently only by reducing the density $D_O$. The reason is that, even if the density $D_O$ of the coarse inclusions in the axis position of the forged product is restricted to 70 nos/cm² or below, if coarse inclusions are present much in the peripheral part (R/3 position) of the forged product, the coarse inclusions segregated in the peripheral part become the starting point of a fatigue failure, the fatigue failure occurs, and fatigue properties of the total forged product deteriorate. For example, if the density $D_O$ of the coarse inclusions in the axis position out of the coarse inclusions whose major axis exceeds 5 μm included in the forged product decreases, the density $D_R$ of the coarse inclusions in the peripheral part increases on the contrary. Therefore, dispersion balance of the coarse inclusions in the radial direction deteriorates and fatigue properties of the total forged product deteriorate.

Consequently, in the forged product in accordance with the present invention, when the radius is made R and the density ($D_R$) of the inclusions whose major axis exceeds 5 μm observed in the R/3 position from the axis position toward the radial direction is measured, the ratio of the density $D_R$ and the density $D_O$ is required to satisfy the inequality (1) below.

$$0.5 \leq D_R/D_O \leq 1.50 \tag{1}$$

If the value $D_R/D_O$ is below 0.5, coarse inclusions become present unevenly in the axis position of the forged product, and fatigue properties in the axis position deteriorate. Therefore, although fatigue properties in the peripheral part improve, fatigue properties of the total forged product deteriorate. Consequently, the value $D_R/D_O$ should be made 0.5 or above, preferably 0.6 or above, and more preferably 0.7 or above. On the other hand, if the value $D_R/D_O$ exceeds 1.50, coarse inclusions become present unevenly in the peripheral part of the forged product and fatigue properties of the peripheral part deteriorate. Therefore, although fatigue properties in the axis position improve, fatigue properties of the total forged product deteriorate. Consequently, the value $D_R/D_O$ should be made 1.50 or below, preferably 1.4 or below, and more preferably 1.3 or below.

It is preferable that the requirements of (A) and (B) are satisfied in both end faces of the forged product. If the density $(D_O)$ of the inclusions whose major axis exceeds 5 μm observed in the axis position is 70 nos/cm$^2$ or below and the ratio of the density $(D_R)$ of the inclusions whose major axis exceeds 5 μm observed in the R/3 position from the axis position toward the radial direction and the density $D_O$ satisfies the inequality (1) in the end faces of the upper part and the bottom part of the forged product, it indicates that coarse inclusions are dispersed homogenously both in the vertical direction and radial direction of the forged product, therefore variation of fatigue strength in the axis position and the peripheral position is little and fatigue properties of the total forged product improve.

The density of the inclusions in the axis position and the peripheral part of the forged product may be measured using, for example, a scanning electron microscope and an EPMA. The density of the inclusions can be calculated by making Al, S, Mn, Ti, Si, O, N, Mg, Ca analyzing object elements, making oxide, sulfide, nitride of these elements or composite inclusions containing any of them an inclusion of an observation object, measuring the number of inclusions whose major axis exceeds 5 μm out of the observed inclusions, and dividing it by the area of the filed of observation.

In the present invention, the size of the inclusion of the observation object is to be made one whose major axis exceeds 5 μm. The reason is because it is considered that fine inclusions whose major axis is 5 μm or below hardly becomes the starting point of a fatigue failure, therefore even if they segregate in the axis position and the peripheral part, they do not affect fatigue properties of the forged product much.

In order to appropriately control the density balance of the coarse inclusions in the axis position and the peripheral part of the forged product, for reducing inclusions in the bottom part of the steel ingot, after molten steel is casted to a mold, the molten steel is solidified while the upper part of the steel ingot is heat-insulated, thereafter a part of the bottom part of the steel ingot is cut and removed, and after grasping the distribution state of the inclusions in the upper part of the steel ingot, a part of the upper part of the steel ingot can be cut and removed. As the amount of discard in the bottom part of the steel ingot and the upper part of the steel ingot is increased, the part of the settled crystal zone in the bottom part of the steel ingot and the part in the upper part of the steel ingot where coarse inclusions coagulate can be more surely removed, however as the amount of discard is increased, the yield lowers and the cost increases.

Therefore, in the present invention, for the forged material obtained by forging the steel ingot manufactured by an ingot making method, the amount of discard from the end part can be determined so that the density $(D_O)$ of the inclusions whose major axis exceeds 5 μm observed in the axis position becomes 70 nos/cm$^2$ or below and the value $D_R/D_O$ comes to be within a range of 0.5-1.50. More specifically, first, the end part of the forged material is cut at several positions, the density of the inclusions whose major axis exceeds 5 μm is measured in each cut face, and the weight of a cut part when the forged material is cut so that the density of the inclusions becomes 70 nos/cm$^2$ or below and the value $D_R/D_O$ comes to be within a range of 0.5-1.50 is measured. Then, in cutting the forged material, the cutting position can be determined according to the diameter and the specific gravity of the forged material so that the cut part of the forged material becomes of the weight.

On the other hand, in order to disperse coarse inclusions so that the ratio of the density $(D_R)$ of the inclusions whose major axis exceeds 5 μm observed in the peripheral part and the density $D_O$ satisfies the inequality (1), heat insulation of the upper part of the steel ingot (riser) immediately after completion of casting can be enhanced. That means, by enhancing heat insulation of the riser, formation of a primary crystal by rapid solidification can be inhibited in the upper part of the steel ingot. By inhibiting formation of the primary crystal, the settled crystal is reduced, and formation of the settled crystal zone in the bottom part of the steel ingot can be inhibited. As a result of it, because formation of coarse inclusions by formation of the settled crystal zone is inhibited in the bottom part of the steel ingot, the coarse inclusions homogenously dispersingly deposit in the peripheral part also without segregating in the axis position.

In order to enhance heat insulation of the riser, the thickness of the heat insulating material placed on the upper part of the steel ingot immediately after completion of casting can be made thicker by approximately 2-3 times compared with that of the conventional case. In other words, although the thickness of the heat insulating material differs according to the size of the steel ingot, the thickness of the heat insulating material which was conventionally 60-200 mm can be made 150-400 mm. More specifically, in manufacturing the steel ingot of a 65 ton level, although the thickness of the heat insulating material was conventionally made approximately 75 mm, it can be made approximately 350 mm in accordance with the present invention.

The kind of the heat insulating material usable in the present invention is not particularly limited, and those publicly known can be used. They are, for example, chaff, carbonized chaff, exothermic insulating material, heat-insulative heat insulating material, expandable heat insulating material, and the like.

<Chemical Composition of Steel>

As described above, the forged product in accordance with the present invention is characterized in appropriately controlling the dispersion state of coarse inclusions whose major axis exceeds 5 μm, and the fundamental composition of the steel is not particularly limited, however, in order to satisfy the strength, toughness and fatigue properties required for a crankshaft or the like, for example, it is desirable to satisfy the fundamental composition described below in view of the general technical level of steel material.

[C: 0.15-0.75%]

C is an element contributing to improving the strength of the forged product, and in order to secure the sufficient strength, it should be contained by 0.15% or above, preferably 0.30% or above, and more preferably 0.34% or above. However, if C content is excessive, toughness of the forged product is deteriorated, therefore it should be made 0.75% or below, preferably 0.6% or below, and more preferably 0.5% or below.

[Si: 0.1-0.6%]

Si acts as an element improving the strength of the forged product, and in order to secure the sufficient strength, it should be contained by 0.1% or above, preferably 0.15% or above, more preferably 0.20% or above, and further more preferably 0.25% or above. However, if Si content is excessive, the inverse-V segregation becomes conspicuous and clean steel ingot becomes difficult to obtain, therefore it should be made 0.6% or below, preferably 0.4% or below, and more preferably 0.35% or below.

[Mn: 0.3-1.4%]

Mn is an element contributing to enhancing quenchability and improving the strength, and in order to secure sufficient quenchability and strength, it should be made 0.3% or above, preferably 0.8% or above, and more preferably 0.9% or above. However, if Mn content is excessive, it promotes the inverse-V segregation, therefore it should be made 1.4% or below, preferably 1.2% or below, and more preferably 1.1% or below.

[Ni: 0.1-2%]

Ni is an element useful as a toughness enhancing element and should be contained by 0.1% or above, preferably 0.2% or above. However, if Ni content becomes excessive, the cost increases, therefore it should be made 2% or below, preferably 1.75% or below.

[Cr: 0.5-2.5%]

Cr is an element effective in improving quenchability and enhancing toughness, and such actions can be exerted by containing Cr by 0.5% or above, preferably 0.7% or above, more preferably 1% or above, further more preferably 1.75% or above. However, if Cr is contained excessively, the inverse-V segregation is promoted and manufacturing of a clean steel ingot becomes difficult, therefore it should be made 2.5% or below, preferably 2.0% or below.

[Mo: 0.1-0.5%]

Mo is an element effectively acting for enhancing all of quenchability, strength and toughness, and in order to exert these actions, it should be contained by 0.1% or above, preferably 0.2% or above, and more preferably 0.25% or above. However, because the equilibrium distribution coefficient of Mo is low and Mo easily causes microsegregation (normal segregation), Mo should be made 0.5% or below, preferably 0.35% or below.

[V: 0.01-0.20%]

V is an element useful in strengthening by enhancing depositing and refining the structure. In order to exert such actions, it should be contained by 0.01% or above, preferably 0.035% or above. However, even if it is contained excessively, the actions described above saturate which economically is a waste, therefore it should be made 0.20% or below, preferably 0.17% or below, and more preferably 0.15% or below.

[Al: 0.015-0.04%]

Al effectively acts as a deoxidizing element in a steel making process and effectively acts for cracking resistance of steel as well. Therefore, Al should be contained by 0.015% or above, preferably 0.02% or above. However, if Al content increases, $Al_2O_3$ is formed as inclusions, and the inclusions segregate and coagulate in solidification to form the coarse inclusions, and fatigue properties of the forged product deteriorate. Therefore, the upper limit should be made 0.04%, preferably 0.03% or below.

[Ti: 0.003% or Below (not Inclusive of 0%)]

Ti is an element improving hydrogen crack resistance of steel by forming fine inclusions such as TiN, TiC, and $Ti_4C_2S_2$ to disperse in steel, and absorbing and retaining excess hydrogen in the steel exceeding the limit of solid solubility. However, if Ti content becomes excessive, coarse nitride is formed as inclusions and the fatigue strength of the forged product is deteriorated. Therefore, Ti should be made 0.003% or below, preferably 0.0025% or below, and more preferably 0.002% or below.

Ti content can be controlled by, for example, adjusting the ratio of the use amounts of an alloy with high impurity Ti amount (low grade alloy) and an alloy with low impurity Ti amount (high grade alloy) in the auxiliary material.

[S: 0.0006% or Below (not Inclusive of 0%)]

S is an element inevitably contained, and is an element lowering the fatigue strength of the forged product by forming sulfide which is coarse as inclusions by segregation in solidification. Therefore, S content should be made 0.0006% or below, preferably 0.0005% or below, and more preferably 0.0004% or below.

S content can be adjusted by, for example, controlling the slag composition in melting. More specifically, S content in molten steel can be lowered by raising the basicity of the slag (ratio of the CaO concentration and $SiO_2$ concentration in the slag, $CaO/SiO_2$, hereinafter may be referred to as "C/S"). When S content is to be lowered, the slag can be positively mixed into the molten steel with the aim of promoting reaction between the molten steel and the slag. On the contrary, when S content is to be increased, the slag composition can be adjusted so as to decrease C/S, and stirring of the molten steel can be weakened in order to inhibit the reaction between the molten steel and the slag. With regard to the measures for mixing the slag into the molten steel, it is very effective to perform a vacuum degassing treatment. In particular, the treatment by a ladle degassing apparatus becomes a very effective means when S content is to be lowered because the slag and the molten steel can be stirred simultaneously. Also, by appropriately performing this vacuum degassing treatment more than once, S content can be further lowered.

As other supportive measures, S content in steel can be lowered by raising the ratio of the CaO concentration and $Al_2O_3$ concentration ($CaO/Al_2O_3$, hereinafter may be referred to as "C/A") of the slag. On the contrary, when S content is to be increased, the slag composition can be adjusted so as to lower "C/S" and/or "C/A".

[N: 0.01% or Below (not Inclusive of 0%)]

N is an element inevitably contained and is an element forming coarse nitride by segregation in solidification and lowering the fatigue strength of the forged product. Therefore, N content should be made 0.01% or below, preferably 0.007% or below, and more preferably 0.005% or below.

N content can be adjusted by controlling the vacuum degassing treatment time in melting, and increase of N content can be inhibited by preventing flowing-in of air in ingot-making.

[O: 0.002% or Below (not Inclusive of 0%)]

O (oxygen) is an element forming oxide-based inclusions such as $SiO_2$, $Al_2O_3$, MgO, CaO or the like and lowering the fatigue strength of the forged product. Therefore, it is preferable to decrease the O content as much as possible, and the total oxygen amount should be made 0.002% or below, preferably 0.0015% or below, and more preferably 0.001% or below.

The fundamental composition used for the forged product in accordance with the present invention is as described above, and balance composition is substantially iron, however inclusion of ultra low amount of inevitable impurities is permissible.

Further, it is also possible to positively contain other elements further in a range not giving a bad influence to the action effects of the present invention. As the examples of other elements on which positive addition is permitted, B (boron) which has a quenchability improvement effect and W, Nb, Ta, Cu, Ce, Zr, Te or the like which is a solid solution enhancing element or depositing enhancing element can be cited. They can be added solely or two or more kinds of them can be added compositely. It is preferable to add these additive elements, for example, with the total amount of approximately 0.1% or below.

The forged product in accordance with the present invention is preferably used for the usage of manufacturing a crankshaft (integral-type crankshaft, in particular). It is preferably used for the crankshaft, particularly, with 200 mm or above diameter for the usage of a diesel engine for power generation or for a vessel. The forged product in accordance with the present invention is effectively utilized widely in the industrial area of machinery, a vessel, a generator and the like, and is particularly suitable to the parts wherein high fatigue strength is required such as the rotary motion parts.

EXAMPLES

Although the present invention is described below in further detail by referring to the examples, the present invention is by no means limited by the examples below and can be implemented with modifications added appropriately within the scope adaptable to the purposes described above and below, and any of them is to be included within the technical range of the present invention.

[Manufacturing of Test Steel]

Test steel was manufactured by melting steel with the chemical composition exhibited in Table 1 (balance is iron with inevitable impurities) by molten steel treating equipment having electrode arc heating function and vacuum degassing treating function, thereafter ingot-making by a bottom pouring method using the molten steel, and forging the steel ingot. More specifically, the molten steel whose composition had been adjusted was poured to a mold of a 30-64 ton class (2-4 m in the total height) by a bottom pouring ingot-making method and was casted. After completion of casting, heat insulating material was placed on the upper part of the steel ingot (riser) and the steel ingot was kept hot. The heat insulating material used contained metal Al as an exothermic agent, and the main component was $Al_2O_3$. The heat insulating material was expansible, and was placed on the riser so that its thickness after expansion became 80-370 mm. The mass of the steel ingot and the thickness of the heat insulating material after expansion are exhibited in Table 2 below.

If the thickness of the heat insulating material in relation with the mass of the steel ingot is similar to that in the conventional case, it is deemed as "not having the heat insulating effect (x)", and if thicker than that in the conventional case, it is deemed as "having the heat insulation effect (○)", which are exhibited in Table 2 below. The criteria of the thickness of the heat insulating material are as follows.

{Criteria}

Thickness of the heat insulating material for 30 ton steel ingot: approximately 150 mm Thickness of the heat insulating material for 40 ton steel ingot: approximately 180 mm Thickness of the heat insulating material for 50 ton steel ingot: approximately 200 mm Thickness of the heat insulating material for 60 ton steel ingot: approximately 300 mm Thickness of the heat insulating material for 70 ton steel ingot: approximately 400 mm After the steel ingot obtained by solidification was separated from the mold, it was heated to approximately 1,200 DEG. C., was hot-forged, and was finished into a forged material with 200-700 mm diameter section. Hot-forging was performed by extending the steel ingot body by a press and shaping thereafter into a circular cross-sectional shape using a dedicated tool. Parts of the forged material were cut off from both end parts of the forged material obtained (the upper part of the steel ingot and the bottom part of the steel ingot) and were separated from the body part (product).

The cutting position of the forged material is exhibited in Table 2 below. The cutting position was shown by a percentage of the distance from the bottom face of the forged material (the lowermost end face in the gravity direction) when the total length of the forged material was made 100%. In other words, the bottom face of the forged material becomes 0% and the uppermost face becomes 100%.

In the upper part of the steel ingot and the bottom part of the steel ingot, test steel was taken from the cut face of the forged material which was cut off (cut face in the product side), and the density of the inclusions and the fatigue strength were measured by a procedure described below.

[Evaluation of Test Steel]

{Measurement of Density of Inclusions by EDS}

In the cut face of the forged material cut off from the upper part of the steel ingot and the bottom part of the steel ingot, samples were taken from the axis position (0R position) and the peripheral part (R/3 position), were embedded in a resin, were subjected to a polishing treatment for microscopic inspection, and were observed at the magnification of 400 times by a scanning electron microscope.

{Identification of Inclusions by EDS}

A sample was taken from the center position of the end part of the forged material with 200-700 mm diameter, was embedded in a resin, and was subjected to a polishing treatment for microscopic inspection, and the section of the steel was observed at the magnification of 100-200 times by a scanning electron microscope. With respect to the inclusion whose major axis exceeded 5 μm present in the observation area of 10 mm×10 mm of each sample, the componential composition was measured using an EPMA, and the number of inclusions was measured. More specifically, an EDS (Energy Dispersive X-ray Spectrometer: an X-ray spectrometer of a characteristic X-ray energy dispersion type, XM-Z0043T made by JEOL Ltd.) attached to an EPMA (JXA-8900RL made by JEOL Ltd.) was used, the irradiating condition of an electron beam was set at accelerating voltage: 15 kV, beam current: $1.70 \times 10^{-9}$ A, beam diameter: 1 μm, and quantitative analysis was performed at the gravity position of the inclusion. The targeted analysis time (time period for irradiation of a beam) was 10 s per one point, and the target dead time was 20%. As described above, the componential composition of the inclusion was measured, the inclusion was identified, the number of inclusions was measured, and the number of the inclusion present per unit area was calculated.

The density of the inclusions whose major axis exceeded 5 μm observed in the axis position was made $D_O$, the density of the inclusions whose major axis exceeded 5 μm observed in the peripheral part was made $D_R$, and the result of measurement on each of the upper part of the steel ingot and the bottom part of the steel ingot was exhibited in Table 3 below. Further, ratio of $D_R$ and $D_O$ ($D_R/D_O$) in the upper part of the steel ingot and the bottom part of the steel ingot was calculated respectively, and the result was exhibited in Table 3 below.

{Fatigue Strength}

In the cut face of the forged material cut off from the upper part of the steel ingot and the bottom part of the steel ingot, a test piece for measuring fatigue strength was taken from the axis position (0R position), and a rotary bending fatigue test was performed under the condition described below.

Test piece: A smooth test piece with a 10 mm diameter
Test method: Rotary bending fatigue test (stress ratio = −1, speed: 3,600 rpm)
Fatigue strength evaluation method: Differential method
Differential stress: 20 MPa
Number of test piece: 5 pieces each Fatigue strength of each test piece = (rupture stress) − (differential stress)

The fatigue strength was measured using 5 test pieces taken respectively from the forged material cut off from the upper part of the steel ingot and the bottom part of the steel ingot, and the average value of the measurement result was exhibited in Table 3 below. Also, the difference of the fatigue strength of the upper part of the steel ingot and the fatigue strength of the bottom part of the steel ingot was calculated and was exhibited in Table 3.

As is clear from Table 3, in Nos. 21-29 which satisfy the requirements stipulated in the present invention, the difference of the fatigue strength of the upper part of the steel ingot and the bottom part of the steel ingot is small which is within 50 MPa. On the other hand, in Nos. 1, 4-7, 9-12, 14, 15, 18-20 which do not satisfy the requirements stipulated in the present invention, the difference of the fatigue strength of the upper part of the steel ingot and the bottom part of the steel ingot is large. Also, although Nos. 2, 3, 8, 13, 16, 17 are the examples which do not satisfy the requirements stipulated in the present invention, the difference of the fatigue strength of the upper part of the steel ingot and the bottom part of the steel ingot is small which is within 50 MPa. However, in Nos. 2, 3, 16, 17, coarse inclusions are formed much in the axis position ($D_0$) in the upper part of the steel ingot, therefore the fatigue strength itself is low. In Nos. 8 and 13, $D_R/D_0$ value in the bottom part of the steel ingot could not be appropriately controlled, therefore the fatigue strength in the bottom part of the steel ingot is low.

Figure 1:
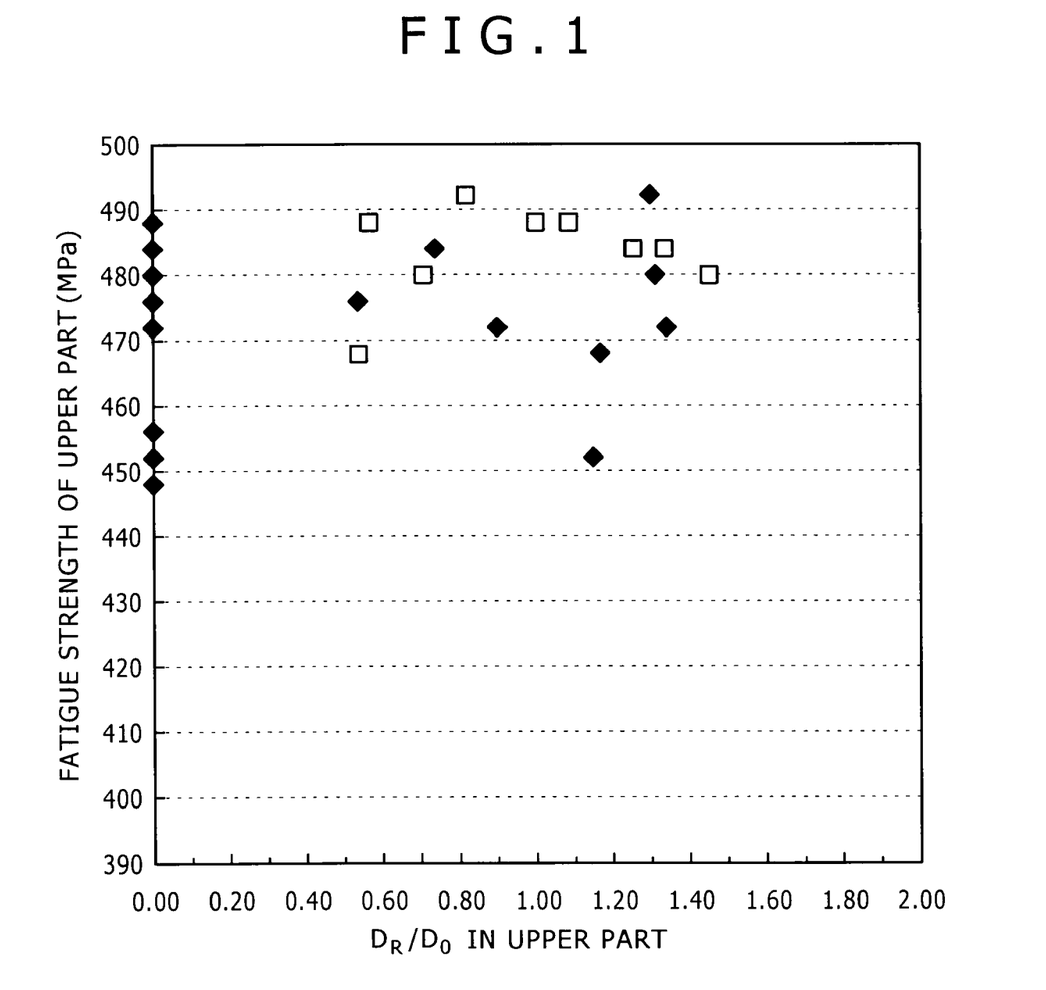
FIG. 1 is a graph showing the relation between ratio of $D_R$ and $D_O$ ($D_R/D_O$) and the fatigue strength in the upper part of a steel ingot.

Next, the relation between the ratio of $D_R$ and $D_0$ ($D_R/D_0$) in the upper part of the steel ingot and the fatigue strength in the upper part of the steel ingot is exhibited in FIG. 1. In FIG. 1, ♦ represents results of Nos. 1-20 in Table 3 and □ represents results of Nos. 21-29 in Table 3 respectively. As is clear from Table 3 and FIG. 1, it is known that correlative relation can hardly be recognized between the ratio of $D_R$ and $D_0$ ($D_R/D_0$) and the fatigue strength in the upper part of the steel ingot.

Figure 2:
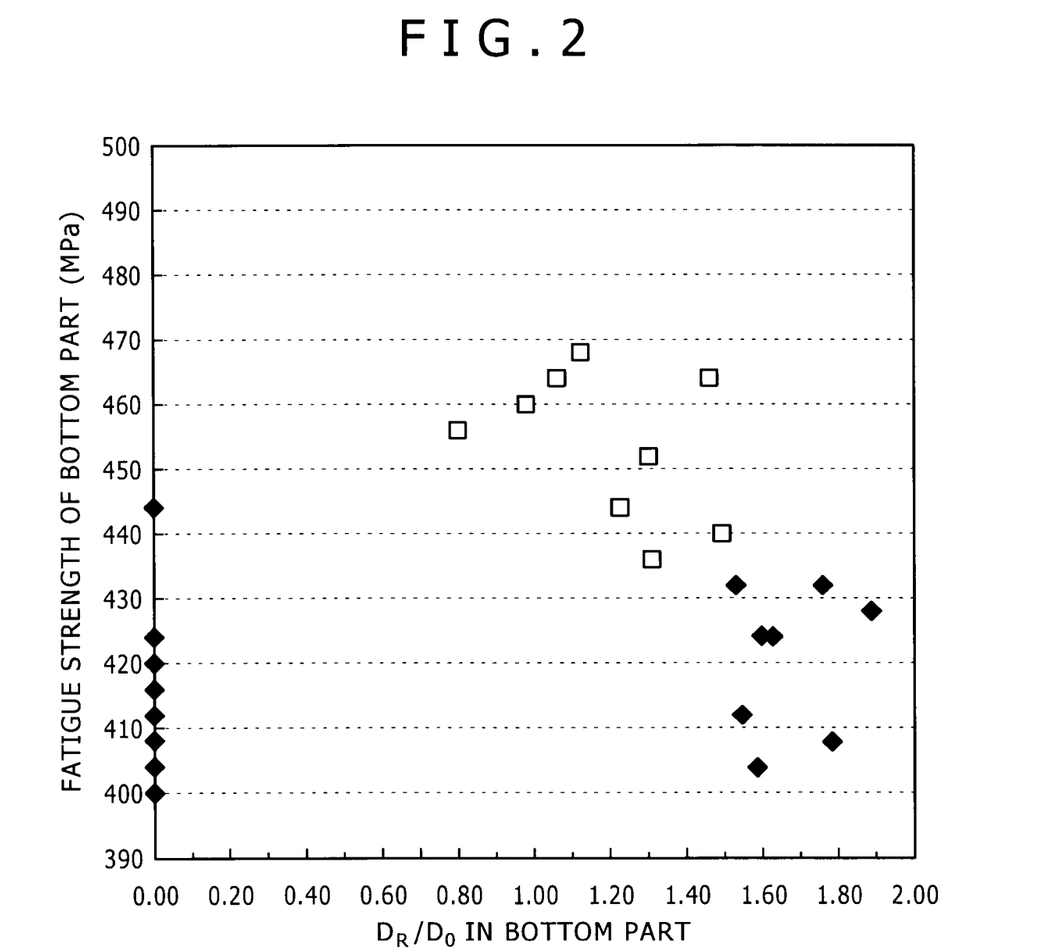
FIG. 2 is a graph showing the relation between ratio of $D_R$ and $D_O$ ($D_R/D_O$) and the fatigue strength in the bottom part of a steel ingot.

Then, the relation between the ratio of $D_R$ and $D_0$ ($D_R/D_0$) in the bottom part of the steel ingot and the fatigue strength in the bottom part of the steel ingot is exhibited in FIG. 2. In FIG. 2, ♦ represents results of Nos. 1-20 in Table 3 and □ represents results of Nos. 21-29 in Table 3 respectively. As is clear from Table 3 and FIG. 2, it is known that the fatigue strength can be enhanced by controlling the ratio of $D_R$ and $D_0$ ($D_R/D_0$) in the range of 0.5-1.50 in the bottom part of the steel ingot.

TABLE 1

| | Componential composition(mass %) | | | | | | | | | | | |
|---|---|---|---|---|---|---|---|---|---|---|---|---|
| No. | C | Si | Mn | Ni | Cr | Mo | V | Al | Ti | S | N | O |
| 1 | 0.41 | 0.24 | 1.00 | 0.22 | 2.03 | 0.25 | 0.06 | 0.02 | 0.0011 | 0.0006 | 0.0060 | 0.0007 |
| 2 | 0.45 | 0.32 | 1.08 | 0.23 | 2.07 | 0.29 | 0.06 | 0.02 | 0.0009 | 0.0006 | 0.0072 | 0.0007 |
| 3 | 0.32 | 0.29 | 0.60 | 1.61 | 1.60 | 0.24 | 0.15 | 0.03 | 0.0006 | 0.0006 | 0.0067 | 0.0006 |
| 4 | 0.45 | 0.26 | 0.65 | 1.65 | 1.83 | 0.31 | 0.18 | 0.02 | 0.0007 | 0.0005 | 0.0072 | 0.0007 |
| 5 | 0.43 | 0.24 | 0.63 | 1.62 | 1.65 | 0.28 | 0.17 | 0.03 | 0.0005 | 0.0006 | 0.0058 | 0.0006 |
| 6 | 0.48 | 0.30 | 0.67 | 1.65 | 1.70 | 0.31 | 0.19 | 0.02 | 0.0014 | 0.0006 | 0.0072 | 0.0005 |
| 7 | 0.41 | 0.25 | 0.94 | 0.41 | 2.13 | 0.33 | 0.09 | 0.03 | 0.0005 | 0.0005 | 0.0050 | 0.0005 |
| 8 | 0.44 | 0.25 | 0.65 | 1.65 | 1.70 | 0.31 | 0.18 | 0.02 | 0.0006 | 0.0005 | 0.0076 | 0.0005 |
| 9 | 0.40 | 0.27 | 0.91 | 0.22 | 2.14 | 0.28 | 0.13 | 0.03 | 0.0007 | 0.0005 | 0.0055 | 0.0005 |
| 10 | 0.44 | 0.27 | 0.67 | 1.62 | 1.69 | 0.29 | 0.18 | 0.02 | 0.0005 | 0.0005 | 0.0060 | 0.0006 |
| 11 | 0.44 | 0.25 | 1.01 | 0.22 | 2.02 | 0.27 | 0.11 | 0.03 | 0.0006 | 0.0005 | 0.0084 | 0.0005 |
| 12 | 0.42 | 0.24 | 1.02 | 0.22 | 2.05 | 0.26 | 0.10 | 0.03 | 0.0005 | 0.0005 | 0.0073 | 0.0005 |
| 13 | 0.46 | 0.33 | 1.08 | 0.23 | 2.07 | 0.30 | 0.06 | 0.02 | 0.0005 | 0.0005 | 0.0066 | 0.0006 |
| 14 | 0.46 | 0.27 | 0.97 | 0.43 | 2.09 | 0.33 | 0.10 | 0.02 | 0.0007 | 0.0005 | 0.0062 | 0.0005 |
| 15 | 0.53 | 0.28 | 0.94 | 0.41 | 2.13 | 0.33 | 0.09 | 0.03 | 0.0010 | 0.0006 | 0.0050 | 0.0005 |
| 16 | 0.48 | 0.25 | 0.97 | 0.42 | 2.08 | 0.33 | 0.09 | 0.02 | 0.0006 | 0.0007 | 0.0062 | 0.0005 |
| 17 | 0.42 | 0.22 | 0.95 | 0.42 | 2.08 | 0.31 | 0.09 | 0.02 | 0.0005 | 0.0005 | 0.0075 | 0.0005 |
| 18 | 0.41 | 0.23 | 0.65 | 1.65 | 1.71 | 0.29 | 0.18 | 0.02 | 0.0007 | 0.0005 | 0.0501 | 0.0005 |
| 19 | 0.43 | 0.25 | 0.63 | 1.59 | 1.66 | 0.30 | 0.17 | 0.02 | 0.0006 | 0.0006 | 0.0052 | 0.0005 |
| 20 | 0.46 | 0.27 | 0.95 | 0.43 | 2.12 | 0.34 | 0.09 | 0.04 | 0.0008 | 0.0009 | 0.0058 | 0.0005 |
| 21 | 0.45 | 0.24 | 0.91 | 0.39 | 2.00 | 0.29 | 0.08 | 0.03 | 0.0005 | 0.0006 | 0.0062 | 0.0005 |
| 22 | 0.42 | 0.27 | 0.88 | 0.41 | 1.95 | 0.29 | 0.08 | 0.04 | 0.0005 | 0.0006 | 0.0044 | 0.0007 |
| 23 | 0.45 | 0.26 | 0.90 | 0.40 | 2.01 | 0.32 | 0.09 | 0.03 | 0.0007 | 0.0005 | 0.0045 | 0.0005 |
| 24 | 0.40 | 0.22 | 0.93 | 0.36 | 1.98 | 0.29 | 0.08 | 0.04 | 0.0005 | 0.0005 | 0.0048 | 0.0005 |
| 25 | 0.43 | 0.23 | 0.92 | 0.38 | 2.01 | 0.30 | 0.08 | 0.03 | 0.0005 | 0.0005 | 0.0058 | 0.0006 |
| 26 | 0.45 | 0.25 | 0.58 | 1.61 | 1.61 | 0.38 | 0.15 | 0.03 | 0.0006 | 0.0005 | 0.0069 | 0.0006 |
| 27 | 0.42 | 0.24 | 1.01 | 1.62 | 2.05 | 0.40 | 0.07 | 0.02 | 0.0005 | 0.0005 | 0.0067 | 0.0005 |
| 28 | 0.45 | 0.25 | 0.92 | 0.37 | 1.99 | 0.29 | 0.08 | 0.03 | 0.0006 | 0.0006 | 0.0045 | 0.0005 |
| 29 | 0.37 | 0.27 | 0.61 | 1.61 | 1.61 | 0.26 | 0.16 | 0.03 | 0.0009 | 0.0004 | 0.0039 | 0.0004 |

TABLE 2

| | | | | Cutting-off position | |
|---|---|---|---|---|---|
| No. | Mass of steel ingot (ton) | Thickness of heat insulating material (mm) | Heat insulating effect | Upper part | Bottom part |
| 1 | 45 | 90 | X | 92% | 8% |
| 2 | 60 | 160 | X | 92% | 12% |
| 3 | 32 | 80 | X | 90% | 14% |
| 4 | 65 | 180 | X | 81% | 5% |
| 5 | 65 | 170 | X | 76% | 8% |
| 6 | 65 | 180 | X | 78% | 10% |
| 7 | 65 | 200 | X | 85% | 4% |
| 8 | 53 | 120 | X | 75% | 21% |
| 9 | 57 | 150 | X | 71% | 16% |
| 10 | 65 | 200 | X | 80% | 15% |

TABLE 2-continued

| No. | Mass of steel ingot (ton) | Thickness of heat insulating material (mm) | Heat insulating effect | Cutting-off position Upper part | Bottom part |
|---|---|---|---|---|---|
| 11 | 60 | 150 | X | 85% | 5% |
| 12 | 65 | 180 | X | 88% | 8% |
| 13 | 42 | 90 | X | 88% | 16% |
| 14 | 47 | 100 | X | 88% | 12% |
| 15 | 65 | 180 | X | 85% | 17% |
| 16 | 47 | 90 | ○ | 91% | 10% |
| 17 | 65 | 160 | ○ | 86% | 10% |
| 18 | 60 | 140 | ○ | 87% | 2% |
| 19 | 47 | 110 | ○ | 84% | 4% |
| 20 | 53 | 110 | ○ | 81% | 1% |
| 21 | 47 | 180 | ○ | 90% | 7% |
| 22 | 65 | 370 | ○ | 88% | 2% |
| 23 | 47 | 200 | ○ | 82% | 5% |
| 24 | 65 | 380 | ○ | 79% | 5% |
| 25 | 60 | 320 | ○ | 83% | 1% |
| 26 | 60 | 290 | ○ | 78% | 8% |
| 27 | 65 | 360 | ○ | 82% | 12% |
| 28 | 60 | 270 | ○ | 80% | 13% |
| 29 | 30 | 160 | ○ | 84% | 13% |

TABLE 3

| | Density of inclusions (nos/cm$^2$) | | | | | | Fatigue strength (MPa) | | |
|---|---|---|---|---|---|---|---|---|---|
| | $D_O$ | | $D_R$ | | $D_R/D_O$ | | | | |
| No. | Upper part | Bottom part | Upper part | Bottom part | Upper part | Bottom part | Upper part | Bottom part | Difference between upper part and bottom part |
| 1 | 56 | 89 | 0 | 0 | 0 | 0 | 484 | 404 | 80 |
| 2 | 80 | 77 | 0 | 0 | 0 | 0 | 452 | 408 | 44 |
| 3 | 72 | 58 | 0 | 0 | 0 | 0 | 456 | 424 | 32 |
| 4 | 67 | 79 | 0 | 0 | 0 | 0 | 472 | 408 | 64 |
| 5 | 57 | 80 | 0 | 0 | 0 | 0 | 488 | 404 | 84 |
| 6 | 48 | 76 | 0 | 0 | 0 | 0 | 484 | 420 | 64 |
| 7 | 60 | 105 | 0 | 0 | 0 | 0 | 488 | 400 | 88 |
| 8 | 67 | 57 | 77 | 91 | 1.15 | 1.60 | 452 | 424 | 28 |
| 9 | 47 | 65 | 55 | 116 | 1.17 | 1.78 | 468 | 408 | 60 |
| 10 | 50 | 44 | 65 | 83 | 1.30 | 1.89 | 492 | 428 | 64 |
| 11 | 55 | 68 | 74 | 105 | 1.35 | 1.54 | 472 | 412 | 60 |
| 12 | 52 | 62 | 28 | 101 | 0.54 | 1.63 | 476 | 424 | 52 |
| 13 | 60 | 50 | 79 | 88 | 1.32 | 1.76 | 480 | 432 | 48 |
| 14 | 65 | 51 | 48 | 78 | 0.74 | 1.53 | 484 | 432 | 52 |
| 15 | 58 | 70 | 52 | 111 | 0.90 | 1.59 | 472 | 404 | 68 |
| 16 | 105 | 62 | 0 | 0 | 0 | 0 | 456 | 424 | 32 |
| 17 | 79 | 49 | 0 | 0 | 0 | 0 | 448 | 444 | 4 |
| 18 | 71 | 93 | 0 | 0 | 0 | 0 | 480 | 416 | 64 |
| 19 | 63 | 84 | 0 | 0 | 0 | 0 | 476 | 412 | 64 |
| 20 | 64 | 81 | 0 | 0 | 0 | 0 | 488 | 420 | 68 |
| 21 | 69 | 66 | 49 | 81 | 0.71 | 1.22 | 480 | 444 | 36 |
| 22 | 69 | 66 | 37 | 70 | 0.54 | 1.06 | 468 | 464 | 4 |
| 23 | 56 | 50 | 61 | 56 | 1.09 | 1.12 | 488 | 468 | 20 |
| 24 | 57 | 61 | 83 | 91 | 1.46 | 1.49 | 480 | 440 | 40 |
| 25 | 56 | 61 | 56 | 79 | 1.00 | 1.30 | 488 | 452 | 36 |
| 26 | 61 | 44 | 50 | 35 | 0.82 | 0.80 | 492 | 456 | 36 |
| 27 | 50 | 44 | 67 | 43 | 1.34 | 0.98 | 484 | 460 | 24 |
| 28 | 51 | 50 | 29 | 73 | 0.57 | 1.46 | 488 | 464 | 24 |
| 29 | 52 | 67 | 65 | 88 | 1.26 | 1.31 | 484 | 436 | 48 |

What is claimed is:

1. A columnar forged product in the form of a circular cylindrical shape having two end faces, obtained by hot forging of a steel ingot containing:
C, 0.15-0.75% (means mass %, hereinafter the same);
Si: 0.1-0.6%;
Mn: 0.3-1.4%;
Ni: 0.1-2%;
Cr: 0.5-2.5%;
Mo: 0.1-0.5%;
V: 0.01-0.20%; and
Al: 0.015-0.04%,
satisfying:
Ti: 0.003% or below (not inclusive of 0%);
S: 0.0006% or below (not inclusive of 0%);
N: 0.01% or below (not inclusive of 0%); and
O: 0.002% or below (not inclusive of 0%),
and the balance comprising iron with inevitable impurities,
wherein a density ($D_O$) of inclusions whose major axis exceeds 5 μm observed in the axis position of a section perpendicular to the axial direction of the forged product is 70 nos/cm$^2$ or below, and,
when the radius of the forged product is R, the ratio of a density ($D_R$) of the inclusions whose major axis exceeds 5 μm observed in the R/3 position from the axis position toward the radial direction and the density $D_O$ satisfies an inequality (1) below at both end faces of the columnar forged product $$0.5 \leq D_R/D_O \leq 1.50 \quad (1),$$ wherein the columnar forged product is further processed by first casting a molten steel obtained from the steel ingot and solidifying the molten steel to form a cast product wherein the solidifying is carried out in a heat insulating material.

2. A crankshaft manufactured from the columnar forged product according to claim 1.

3. The crankshaft according to claim 2 used for a diesel engine for power generation or for a vessel, wherein the shaft diameter is 200 mm or above.

4. The columnar forged product according to claim 1, wherein the steel ingot contains:
C: 0.37-0.45%;
Si: 0.22-0.27%;
Mn: 0.61-1.01%;
Ni: 0.36-1.62%;

Cr: 1.61-2.01%;
Mo: 0.26-0.40%;
V: 0.07-0.16%;
Al: 0.02-0.04%;
Ti: 0.0005-0.0009%;
S: 0.00004-0.00006%;
N: 0.039-0.069%; and
O: 0.00004-0.00007%.

5. The columnar forged product according to claim 1, wherein the steel ingot contains:
C: 0.34-0.5%;
Si: 0.25-0.35%;
Mn: 0.9-1.01%;
Ni: 0.2-1.75%;
Cr: 1.75-2.0%;
Mo: 0.25-0.35%;
V: 0.35-0.15%;
Al: 0.02-0.03%;
Ti: less than 0.002%;
S: less than 0.004%;
N: less than 0.005%; and
O: less than 0.001%.

6. The columnar forged product according to claim 1, wherein the steel ingot contains Cr in an amount of from more than 0.7% to 2.5%.

7. The columnar forged product according to claim 1, wherein the steel ingot contains Cr in an amount of from 1% to 2.5%.

8. The columnar forged product according to claim 1, wherein the density $D_O$ is 61 nos/cm$^2$ or below.

9. The columnar forged product according to claim 1, wherein the density $D_R$ satisfies the inequality $0.71 \leq D_R/D_O \leq 1.34$.

10. The columnar forged product according to claim 1, wherein the density $D_R$ satisfies the inequality $0.5 \leq D_R/D_O \leq 1.34$.

11. The columnar forged product according to claim 1, wherein the density $D_R$ satisfies the inequality $0.54 \leq D_R/D_O \leq 1.46$.

12. The columnar forged product according to claim 1, wherein the density $D_R$ satisfies the inequality $0.54 \leq D_R/D_O \leq 1.46$ for on end face of the columnar forged product and the inequality $0.80 \leq D_R/D_O \leq 1.49$ for the other end face.

13. The columnar forged product according to claim 1, wherein the heat insulating material has a thickness corresponding to a 30 ton steel ingot of 150 mm, a thickness corresponding with a 40 ton steel ingot of 180 mm, a thickness corresponding with a 50 ton steel ingot of 200 mm, a thickness corresponding with a 60 ton steel ingot of 300 mm and a thickness corresponding with a 70 ton steel ingot of 400 mm.

14. The columnar forged product according to claim 1, wherein the heat insulating material has a thickness corresponding with a 65 ton level of about 355 mm.

15. The columnar forged product according to claim 1, wherein the heat insulating material is at least one selected from the group consisting of a chaff, a carbonized chaff, an exothermic insulating material, a heat-insulative heat insulating material, and an expandable heat insulating material.

16. The columnar forged product according to claim 1, wherein the heat insulating material comprises aluminum metal as an exothermic agent and $Al_2O_3$ as a main component.

* * * * *